(12) United States Patent
Tang

(10) Patent No.: US 8,826,864 B2
(45) Date of Patent: Sep. 9, 2014

(54) EMERGENCY SELF-LOCKING PET RETRACTOR

(75) Inventor: Wenwei Tang, Jinhua (CN)

(73) Assignee: Zhejiang Universe Industry Co., Ltd., Jinhua, Zhejiang Province (CN)

( * ) Notice: Subject to any disclaimer, the term of this patent is extended or adjusted under 35 U.S.C. 154(b) by 7 days.

(21) Appl. No.: 13/634,818

(22) PCT Filed: Aug. 30, 2011

(86) PCT No.: PCT/CN2011/079097
§ 371 (c)(1),
(2), (4) Date: Sep. 13, 2012

(87) PCT Pub. No.: WO2012/129890
PCT Pub. Date: Oct. 4, 2012

(65) Prior Publication Data
US 2013/0125832 A1 May 23, 2013

(30) Foreign Application Priority Data

Mar. 31, 2011 (CN) .......................... 2011 1 0079889

(51) Int. Cl.
*A01K 27/00* (2006.01)
*B65H 75/44* (2006.01)
(52) U.S. Cl.
CPC ........... *A01K 27/004* (2013.01); *B65H 2701/35* (2013.01); *B65H 75/4434* (2013.01)
USPC ....................................................... 119/795
(58) Field of Classification Search
CPC ..... A01K 27/00; B65H 75/34; B65H 75/4434
USPC .......................... 119/794, 795, 796, 797, 798; 242/396.2, 396.4
See application file for complete search history.

(56) References Cited

U.S. PATENT DOCUMENTS

| 1,995,221 | A | * | 3/1935 | Peel et al. | ..................... 242/265 |
| 3,635,419 | A | * | 1/1972 | Pringle | ..................... 242/382.3 |

(Continued)

FOREIGN PATENT DOCUMENTS

| CN | 2847844 Y | 12/2006 |
| DE | 20313853 U1 | 1/2004 |
| DE | 202009017125 U1 | 5/2010 |

*Primary Examiner* — Rob Swiatek
*Assistant Examiner* — Ebony Evans
(74) *Attorney, Agent, or Firm* — Jacobson Holman PLLC; Jiwen Chen

(57) ABSTRACT

The present invention relates to a pet retractor, more particularly to an emergency self-locking pet retractor, comprising a collar, a leash, a leash spool, a shell body and a grip handle, in which it also comprises an emergency self-locking device. The emergency self-locking device includes a switch sliding block disposed on an external surface of the shell body and inserted into the shell body, a self-locking sliding block and a return spring thereof disposed in the shell body and attached to the switch sliding block, a self-locking baffle and a return torsion spring thereof disposed on an external surface of the leash spool and whose one end is hinged on the leash spool, and a self-locking baffle block disposed at the corresponding part on the external surface of the leash spool. When the pet suddenly breaks out or rises up, the emergency self-locking device can automatically lock the spool to prevent the leash from being pulled out, so that the pet cannot run around, attack people or damage properties. The pet is well protected from being hit by vehicles and it cannot hurt others. Consequently, the pet's safety is ensured, other people and properties will not be hurt or damaged and the owner's economic loss is avoided.

4 Claims, 3 Drawing Sheets

(56) References Cited

U.S. PATENT DOCUMENTS

| | | | |
|---|---|---|---|
| 3,693,596 A * | 9/1972 | Croce et al. | 119/796 |
| 6,273,354 B1 * | 8/2001 | Kovacik et al. | 242/404 |
| 6,352,213 B1 * | 3/2002 | Sumiyashiki et al. | 242/383.2 |
| 6,530,536 B2 * | 3/2003 | Sumiyashiki et al. | 242/383.2 |
| 6,694,922 B2 * | 2/2004 | Walter et al. | 119/772 |
| 7,744,030 B2 * | 6/2010 | Sumiyashiki | 242/383.1 |
| 7,784,728 B2 * | 8/2010 | Shi | 242/385.4 |
| 8,516,979 B2 * | 8/2013 | Ek | 119/796 |
| 2007/0022975 A1 * | 2/2007 | Arnold | 119/796 |
| 2008/0011895 A1 | 1/2008 | Bleshoy | |

\* cited by examiner

EMERGENCY SELF-LOCKING PET RETRACTOR

This is a U.S. national stage application of PCT Application No. PCT/CN2011/079097 under 35 U.S.C. 371, filed Mar. 31, 2011 in Chinese, which are hereby incorporated by reference.

FIELD OF THE INVENTION

The present invention relates to a pet retractor, more particularly to an emergency self-locking pet retractor.

BACKGROUND OF THE INVENTION

Generally, a manual device is applied in conventional retractable pet retractors to lock the leash spools so as to control the length of the leashes to further control the pet within a certain distance, e.g. retractable dog leashes. However, when people walk their pets, they might not pay full attention to their pets' activities. When the pets see their favorite things or when they are frightened or teased, they are likely to run around or rush into the street to hit vehicles. Some pets, such as dogs, that are likely to hurt people or damage things may rush to people or objects and cause injuries to people or damages to properties, causing economic loss to their owners or causing body harm and property loss to others.

SUMMARY OF THE INVENTION

In view of the above-described problems, it is one object of the present invention to provide an emergency self-locking pet retractor, which is used to lock pets when they suddenly break out or rises up. It is especially suitable for pets, such as dogs, that are likely to hurt people or damage properties.

To achieve the above object, in accordance with the present invention, there is provided an emergency self-locking pet retractor, comprising a collar, a leash, a leash spool, a shell body and a grip handle, characterized in that it also comprises an emergency self-locking device. The emergency self-locking device comprises a switch sliding block disposed on an external surface of the shell body and inserted into the shell body, a self-locking sliding block and a return spring thereof disposed in the shell body and attached to the switch sliding block, a self-locking baffle and a return torsion spring thereof disposed on an external surface of the leash spool and whose one end is hinged on the leash spool, and a self-locking baffle block disposed at the corresponding part on the external surface of the leash spool.

The object of the present invention is achieved by the emergency self-locking device. When the pet suddenly breaks out or rises up, the emergency self-locking device can automatically lock the leash spool to prevent the leash from being pulled out, so that the pet cannot run around, attack people or damage properties. The pet is well protected from being hit by vehicles and it cannot rush to people or properties and hurt people or damage properties. Consequently, the pet's safety is ensured, others and properties will not be hurt or damaged and the owner's economic loss is avoided.

Figure 1:
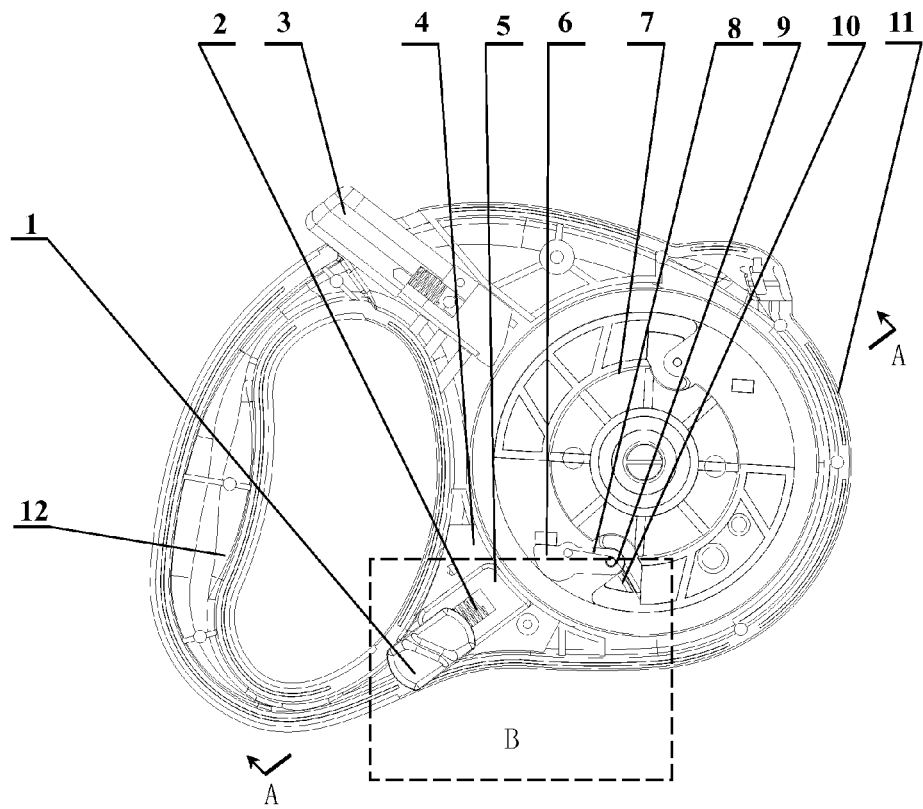
FIG. 1 is a structural representation of an emergency self-locking pet retractor of the present invention.
Figure 2:
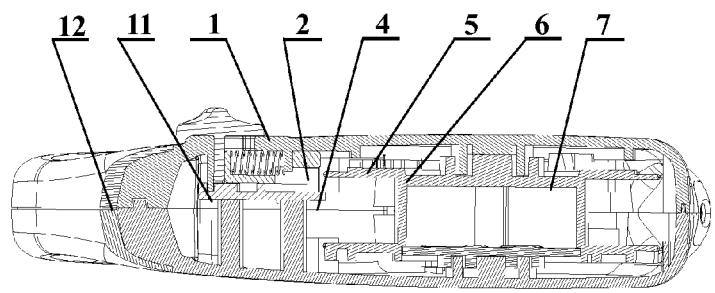
FIG. 2 is a sectional view of FIG. 1 taken from line A-A.
Figure 3:
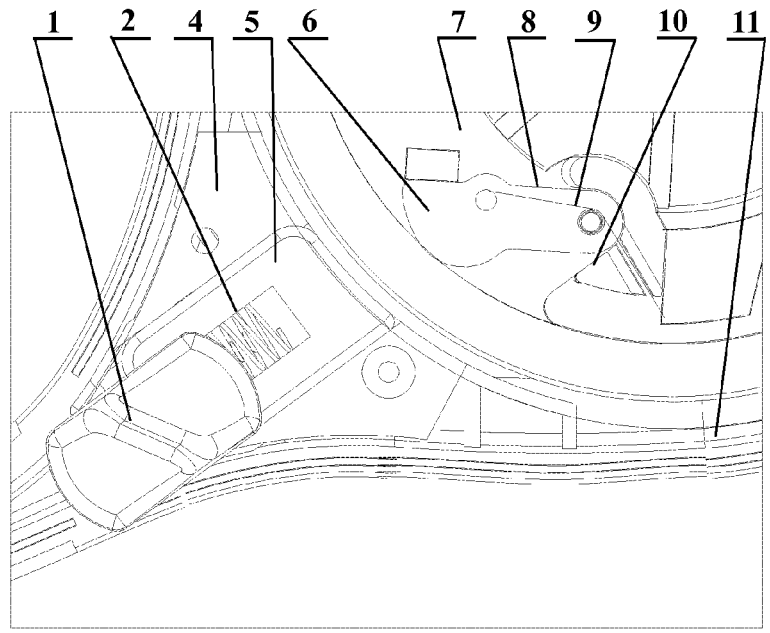
FIG. 3 is an enlarged view of part B of FIG. 1.

As shown in the drawings, an emergency self-locking pet retractor provided by the present invention comprises a switch sliding block 1, a return spring 2, a leash switch 3, a self-locking switch spacer 4, a self-locking sliding block 5, a self-locking baffle 6, a leash spool 7, a return torsion spring 8 (for the self-locking baffle), a rotating shaft 9 (for the self-locking baffle), a self-locking baffle block 10 (for the self-locking baffle), a shell body 11 and a grip handle 12.

DETAILED DESCRIPTION OF THE EMBODIMENTS

The present invention is explained in further detail below with reference to an example and accompanying drawings.

As shown in the drawings, an emergency self-locking pet retractor, in accordance with the present invention, comprises a collar, a leash, a leash spool 7, a shell body 11 and a grip handle 12. It also comprises an emergency self-locking device, which includes a switch sliding block 1 disposed on the external surface of the shell body 11 and inserted into the shell body 11, a self-locking sliding block 5 and a return spring 2 thereof disposed in the shell body 11 and attached to the switch sliding block 1, a self-locking baffle 6, a return torsion spring 8 and a rotating shaft 9 for such self-locking baffle disposed on an external surface of the leash spool 7 and whose one end is hinged on the leash spool 7, and a self-locking baffle block 10 disposed at the corresponding part on the external surface of the leash spool 7.

Figure 4:
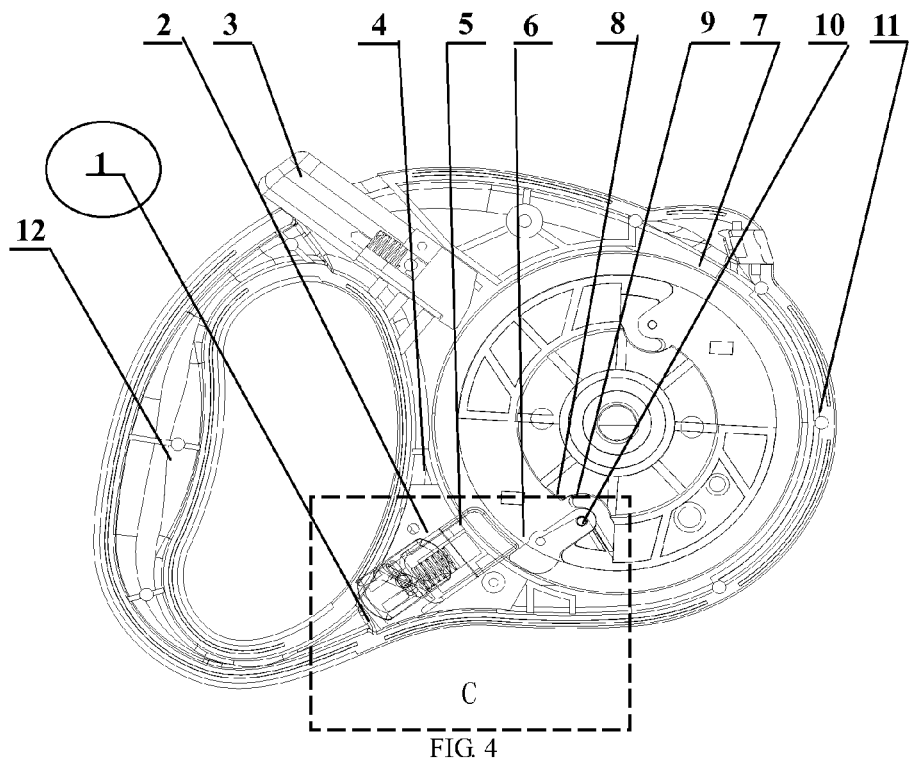
FIG. 4 is a schematic diagram of a locking structure of FIG. 1.
Figure 5:
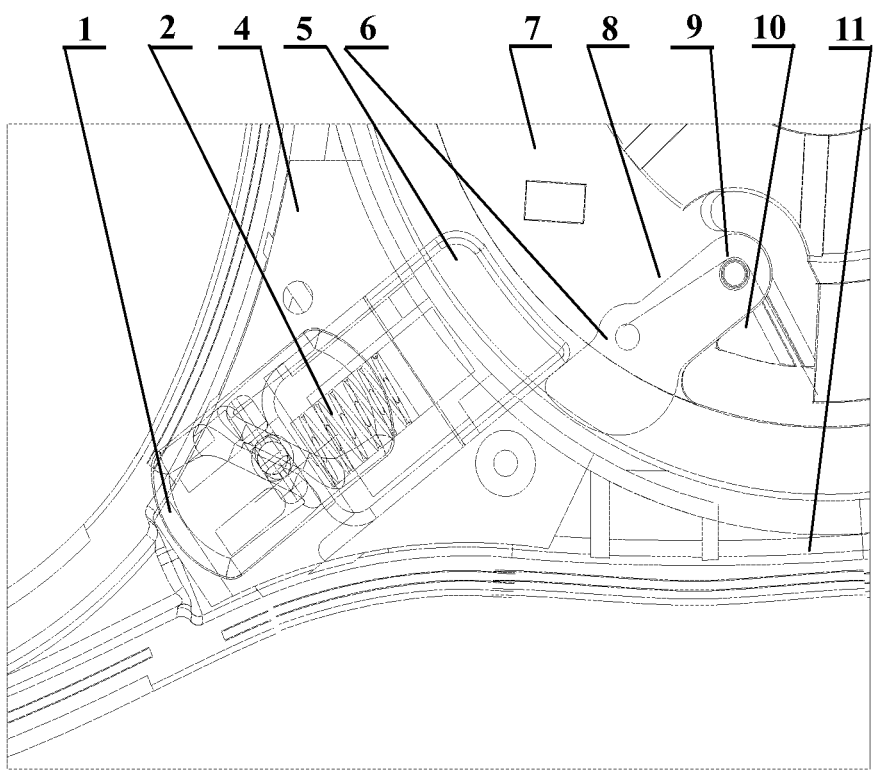
FIG. 5 is an enlarged view of part C of FIG. 4.

When the switch sliding block 1 is pushed forward, the self-locking sliding block 5 disposed in the shell body 11 and attached to the switch sliding block 1 slides forward accordingly and its head extends into the corresponding space formed between the edge of the leash spool 7 and the shell body 11. As shown in FIG. 1, when the leash is normally pulled out, the self-locking baffle 6 rotates with the leash spool 7 under the effects of the return torsion spring 8. As shown in FIG. 4, when the acceleration speed reaches a certain degree, namely, when the leash is rapidly pulled out, the self-locking baffle 6, under the inertial force, overcomes the restriction of the return torsion spring 8 to rotate around the rotating shaft 9. When the self-locking baffle 6 rotates to be against the self-locking baffle block 10, it is completely open. After the leash spool 7 rotates to the position of the self-locking sliding block 5, the self-locking baffle is stopped by the head of the self-locking sliding block 5 extending into the corresponding space formed between the edge of the leash spool 7 and the shell body 11, the leash spool 7 is then stopped and the leash cannot be pulled out any longer. The emergency locking is achieved. In other words, when the pet suddenly breaks out or rises up, the leash is pulled out rapidly and the emergency self-locking device will function. As shown in FIG. 1, when the stretching force of the leash disappears, the self-locking baffle 6 restores its original conditions under the effects of the return torsion spring 8. As a result, when the emergency self-locking is required, the user can only push the switch sliding block 1 forward. When the emergency self-locking device is open, the leash can be normally pulled out.

In order to achieve compact and simple structure, the self-locking baffle block 10 is directly disposed on the leash spool 7, i.e. the self-locking baffle block 10 acts as a convex block projected from the leash spool 7 (as shown in the drawings). In order for the switch block 1, the self-locking sliding block 5 and the return spring 2 to be easily mounted, the emergency self-locking pet retractor is also disposed with a self-locking switch spacer 4 as shown in the drawings.

The invention claimed is:

1. An emergency self-locking pet retractor, comprising:
   a collar, a leash, a leash spool, a shell body, a grip handle and
   a self-locking device, wherein
   the self-locking device includes a switch sliding block disposed on an external surface of the shell body and inserted into the shell body, a self-locking sliding block and a return spring thereof disposed in the shell body and attached to the switch sliding block, a self-locking baffle and a return torsion spring thereof disposed on an external surface of the leash spool and one end of the self-locking baffle is hinged on the leash spool, and a self-locking baffle block disposed at a corresponding part on the external surface of the leash spool.

2. The emergency self-locking pet retractor according to claim 1, wherein the self-locking baffle block is directly disposed on the leash spool.

3. The emergency self-locking pet retractor according to claim 2, wherein the self-locking device is also disposed with a self-locking switch spacer.

4. The emergency self-locking pet retractor according to claim 1, wherein the self-locking device is also disposed with a self-locking switch spacer.

* * * * *